US008052801B2

(12) United States Patent
Freeman et al.

(10) Patent No.: US 8,052,801 B2
(45) Date of Patent: Nov. 8, 2011

(54) PIPELINE PIG LAUNCH PIN AND RETRACTION SYSTEM

(75) Inventors: Eric N. Freeman, Kiefer, OK (US); Robert F. Strong, Collinsville, OK (US); Charles Culver Gidden Cooper, Arvada, CO (US); Scott Douglas Nelson, Denver, CO (US); Mark Russell Henault, Westminster, CO (US)

(73) Assignee: TDW Delaware, Inc., Wilmington, DE (US)

( * ) Notice: Subject to any disclaimer, the term of this patent is extended or adjusted under 35 U.S.C. 154(b) by 403 days.

(21) Appl. No.: 12/350,335

(22) Filed: Jan. 8, 2009

(65) Prior Publication Data

US 2010/0170535 A1   Jul. 8, 2010

(51) Int. Cl.
*B08B 9/055*   (2006.01)
*B08B 9/027*   (2006.01)
*B08B 9/04*   (2006.01)

(52) U.S. Cl. ........... 134/8; 15/3.5; 15/3.52; 15/104.061; 15/104.062; 134/6; 134/22.1

(58) Field of Classification Search ...................... 15/3.5, 15/3.52
See application file for complete search history.

(56) References Cited

U.S. PATENT DOCUMENTS

| | | | |
|---|---|---|---|
| 2,632,458 A | 3/1953 | Slomer | |
| 2,860,356 A | 11/1958 | Matheny | |
| 3,495,546 A | 2/1970 | Brown et al. | |
| 4,077,435 A * | 3/1978 | Van Scoy | 138/93 |
| 4,332,277 A | 6/1982 | Adkins et al. | |
| 4,491,018 A | 1/1985 | Stringer et al. | |
| 4,498,811 A | 2/1985 | Fern et al. | |
| 4,709,719 A | 12/1987 | Littleton et al. | |
| 4,769,598 A | 9/1988 | Krieg et al. | |
| 4,885,084 A | 12/1989 | Doyle | |
| 5,029,614 A | 7/1991 | Lara et al. | |

(Continued)

FOREIGN PATENT DOCUMENTS

GB   1410194   10/1975

OTHER PUBLICATIONS

International Search Report and Written Opinion, issued by the International Searching Authority (ISA/US) on Mar. 15, 2010 (PCT/US10/20088); 9 pages.

*Primary Examiner* — Michael Barr
*Assistant Examiner* — Caitlin N Dennis
(74) *Attorney, Agent, or Firm* — Gable Gotwals (57) ABSTRACT

A method and system for launching a pipeline pig includes the steps of compressing a modulating bypass valve of a pipeline pig and installing a locking means to temporally maintain the bypass valve in the compressed state. Once the pig has travelled a predetermined distance through the pipeline, the locking means is released and retrieved through the launch trap door. The locking means is preferably a launching pin having a clip attachment that receives the clips of a retractable lead. The lead is housed by a retraction device that is detachably secured to the launch trap door. The modulating valve has sufficient mass and aerodynamic drag to overcome the force of a gas spring. The valve moves between a retracted and compressed position substantially instantaneously upon the pipeline pig stalling and between the compressed and retracted position substantially instantaneously upon the pipeline pig accelerating.

6 Claims, 8 Drawing Sheets

U.S. PATENT DOCUMENTS

| | | | |
|---|---|---|---|
| 5,084,764 A | 1/1992 | Day | |
| 5,208,936 A | 5/1993 | Campbell | |
| 5,884,656 A | 3/1999 | Smith | |
| 5,913,637 A | 6/1999 | Rajabali et al. | |
| 5,927,319 A | 7/1999 | Burkhalter | |
| 5,992,246 A | 11/1999 | Nice | |
| 6,070,285 A | 6/2000 | Geppert | |
| 6,098,231 A * | 8/2000 | Smith et al. | 15/104.061 |
| 6,190,090 B1 | 2/2001 | Campbell et al. | |
| 6,336,238 B1 | 1/2002 | Tarlton | |
| 6,370,721 B1 | 4/2002 | Torres, Jr. et al. | |
| 6,533,032 B1 | 3/2003 | Seixas et al. | |
| 6,925,671 B1 | 8/2005 | Mouton | |
| 7,231,812 B1 | 6/2007 | Lagare | |
| 2007/0110864 A1 | 5/2007 | Galloway | |
| 2010/0000037 A1 | 1/2010 | Pruett et al. | |

* cited by examiner

Fig. 11

PIPELINE PIG LAUNCH PIN AND RETRACTION SYSTEM

FIELD OF INVENTION

This invention relates to devices and methods for launching pipeline pigs. More specifically, the invention relates to systems and methods for controlling pressure differential across the pig during its launch into a pipeline.

BACKGROUND

Pipeline pigs perform various pipeline maintenance, cleaning and inspection operations while the pipeline continues to operate under pressure and transport product. The pig is introduced into the pipeline by way of a trap (the "pig launcher") connected to the pipeline. Once the pig is placed inside the launcher, the closure door of the launcher is closed and pipeline flow is used to push the pig into and through the pipeline. The pig continues to travel through the pipeline until the pig reaches a receiving trap (the "pig catcher").

In order to launch itself properly into the pipeline, the pig must experience an adequate pressure differential across the pig body. The ability to control bypass flow through the pig body, therefore, is critical to providing sufficient acceleration of the pig during its launch into the pipeline and controlling the speed of the pig as it travels through the pipeline. In many cases—such as those where minimal flow is available to push the pig out of the launcher and into the pipeline—it is desirable to have minimum bypass flow through the pig during the initial launch phase, that is, up until the time at which the pig passes the first mainline valve and bypass tee.

BRIEF SUMMARY OF THE INVENTION

A method and system for launching a pipeline pig includes the steps of compressing a modulating bypass valve of the pig so that the valve is in a compressed position and installing a locking means to temporally maintain the bypass valve in the compressed position. Once the pig has travelled a predetermined distance through the interior of the pipeline, the locking means is released and retrieved through the launch trap door as the pig continues travelling in an opposite direction through the pipeline. The locking means is preferably a launching pin having a clip attachment that receives the clips of a retractable lead. The lead is housed by a retraction device that is detachably secured to the launch trap door. The length of the lead is such that it allows the pig to travel past the first mainline valve and bypass tee before the lead runs out of length.

The system for use in launching the pipeline pig includes a modulating bypass valve effective for controlling bypass flow through the pipeline pig and a locking means for temporarily securing the modulating valve in a compressed position. The locking means is in communication with a retrieval means such as a retractable lead. The lead has a length L effective for allowing the pipeline pig to travel past the first mainline valve and bypass tee downstream of the pig launcher. When the lead reaches the end of its length, the locking means is retracted and retrieved through the launch trap door. The modulating valve then operates in a normal operating mode as the pig continues to travel through the pipeline. The locking means may be in the form of a launch pin and a ball detent arrangement may hold the modulating valve in its compressed state.

The modulating bypass valve may be located rearward of an inlet side of the venturi. A gas spring controls the response of the valve and the valve has sufficient mass and aerodynamic drag to overcome the force of the gas spring. The initial position of the modulating valve may be adjusted by an adjustment screw and the output force of the gas spring may be adjusted by an adjustment screw. The modulating valve has a first (retracted) position and a second (compressed) position. When in the first position, the modulating valve allows a predetermined maximum bypass flow through venturi. When in the second position, the modulating valve allows a predetermined minimum bypass flow through the venturi. The valve moves between the first position and the second position substantially instantaneously upon the pipeline pig stalling and between the second position and the first position substantially instantaneously upon the pipeline pig accelerating.

DETAILED DESCRIPTION OF THE PREFERRED EMBODIMENTS

Preferred embodiments of a pipeline pig launch pin and retraction device will now be described by making reference to the drawings and the following elements illustrated in the drawings:

| | |
|---|---|
| 10 | Launch pin |
| 12 | Body/pin portion |
| 14 | Top end/head |
| 16 | Bottom end |
| 18 | Clip attachment |
| 20 | Bolt |
| 30 | Retractor device |
| 32 | Housing |
| 34 | Lead |
| 36 | Clip |
| 40 | Pipeline pig |
| 42 | Body |
| 44 | Forward end |
| 46 | Rearward end |
| 48 | Passageway |
| 50 | Radial sealing discs |
| 52 | Radial sealing discs |
| 54 | End plate |
| 55 | Central hub with spokes |
| 56 | Venturi |
| 58 | Inlet side |
| 60 | Modulating bypass valve |
| 62 | Valve/head stopper |
| 64 | Adjustment screw |
| 66 | Cylindrical recess |
| 68 | Balls |
| 70 | Housing |
| 72 | Forward bracket |
| 74 | Valve sleeve |
| 76 | Detents |
| 78 | Plunger |
| 80 | Gas spring |
| 82 | Adjustment screw |

Figure 1:
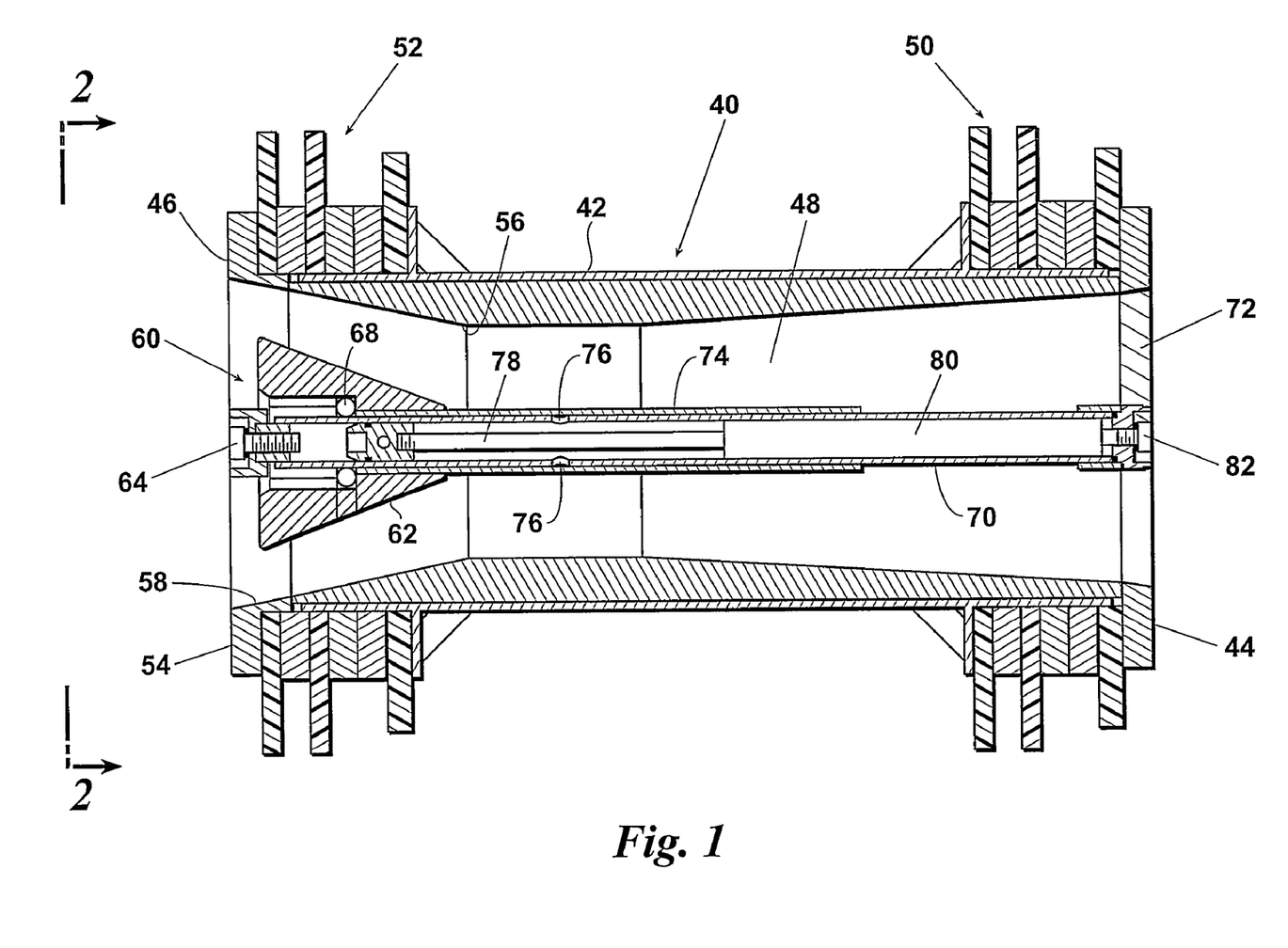
FIG. 1 is a cross-sectional view of a pipeline pig prior to launch preparation. The pig includes a modulating bypass valve for regulating the speed of the pig by controlling bypass flow through the pig as the pig travels through a pipeline. A gas spring holds the modulating valve in an open position and provides a means for adjusting the response of the modulating valve. The gas spring has a preload capacity selected to match pipeline conditions. Spring preload capacity or output force may be adjusted by way of a spring valve or by providing a shorter or longer spring adjustment screw.
Figure 2:
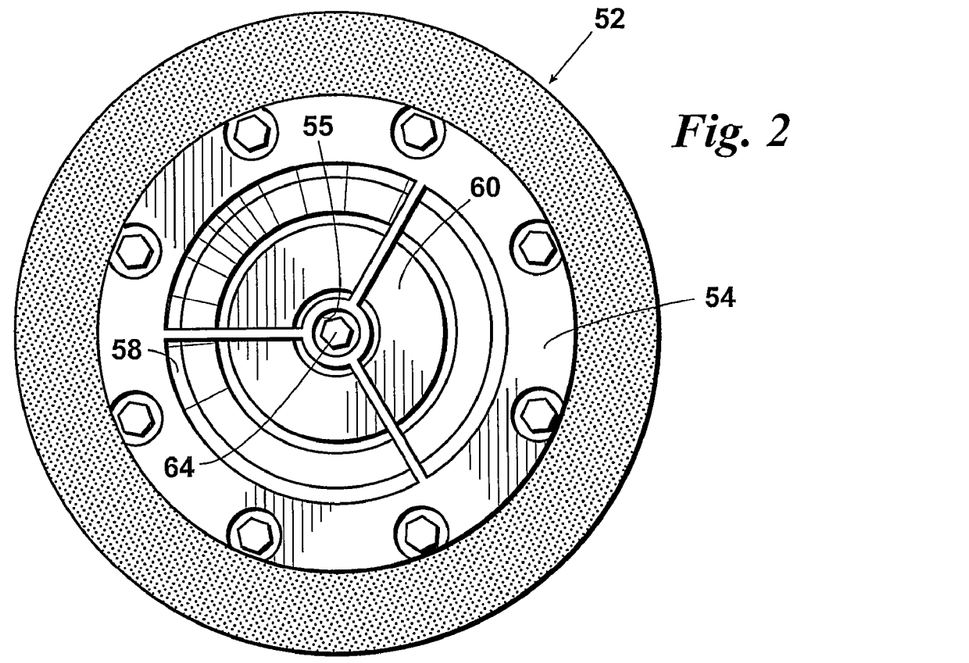
FIG. 2 is a view of the pipeline pig taken along section line 2-2 of FIG. 1. The maximum bypass flow through the venturi may be manually adjusted prior to launching the pig by replacing a rearward adjustment screw with a longer substitute to prevent the modulating valve from reaching a fully opened position.
Figure 3:
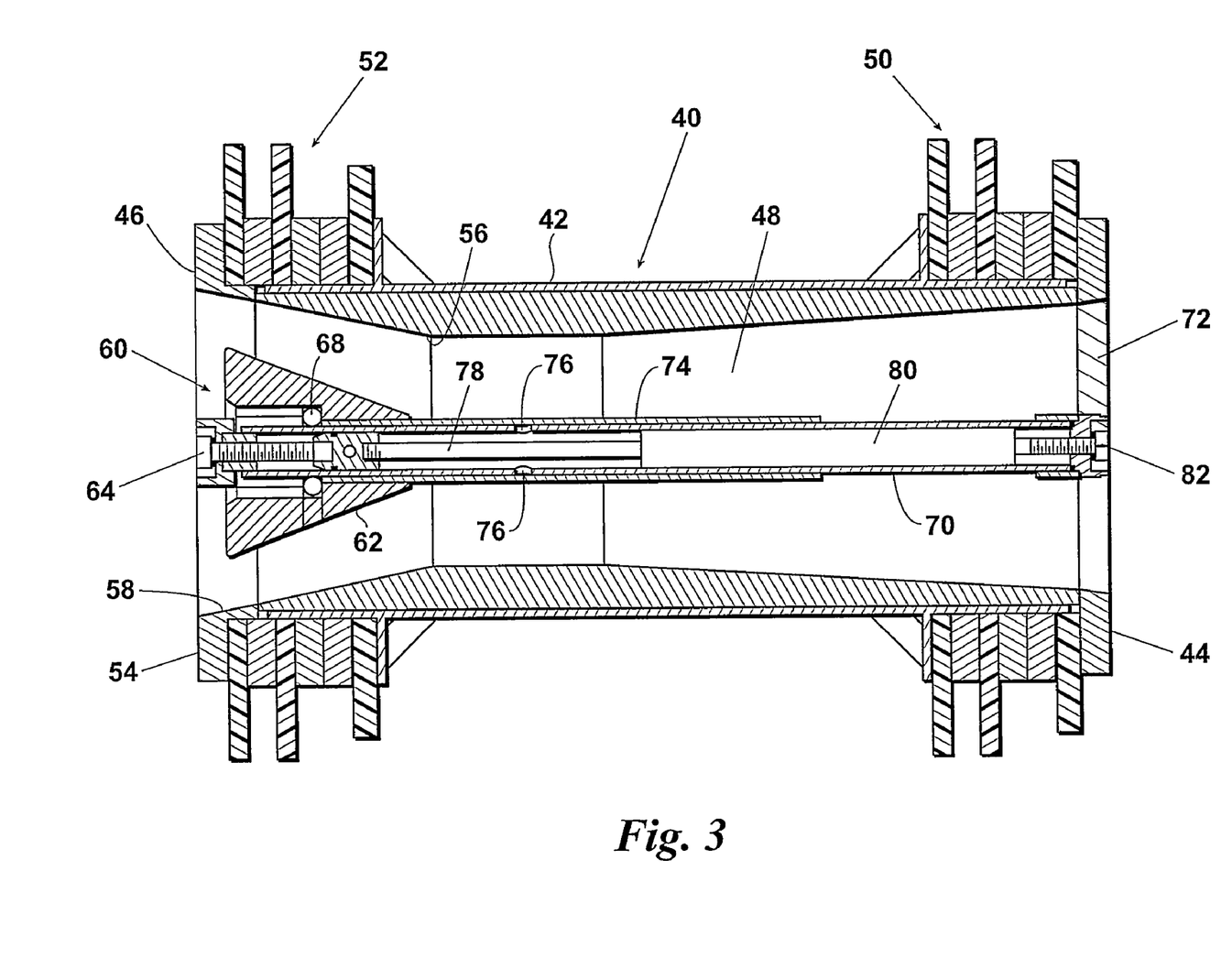
FIG. 3 is another view of the pipeline pig prior to launch preparation. A longer spring adjustment screw compresses the gas spring, thereby increasing the output force of the gas spring in comparison to the shorter spring adjustment screw of FIG. 1.

Referring first to FIGS. 1 to 3, in a preferred embodiment a pipeline pig 40 includes a longitudinal, cylindrical body 42, a forward end 44, a rearward end 46, and a venturi-shaped passageway 48 therethrough. A set of radial discs 50 and 52 provide sealing engagement with the inner wall surface of the pipeline in order to propel pig 40 forward under differential fluid pressure. The venturi-shaped passageway 48 increases the amount of bypass flow though the pig, which helps minimize the pressure drop across the pig 40 and thus maximize the reduction in traveling speed of pig 40 in high velocity flow pipelines. Centralized bypass 48 includes a venturi 56 that preferably has a long shallow taper toward the forward end 44 in order to avoid turbulence and thus improve the efficiency of bypass flow. Minimizing the pressure drop, however, increases the likelihood of stalling should pig 40 encounter some higher friction portions of the pipeline such as increased wall thickness, bends, or accumulated debris at the forward end 44 of pig 40. An anti-stalling feature, therefore, is required.

Modulating bypass valve 60 prevents stalling and regulates the bypass flow through pig 40. In a preferred embodiment, valve 60 includes a frustoconical-shaped valve head or stopper 62 that has substantially the same shape as a portion of an interior surface of venturi 56. Stopper 62 is attached to a plunger 78 and held in an open position at rearward end 46 by a gas spring 80. A spoke-and-rim style end plate 54 located at rearward end 46 limits the rearward movement of stopper 62 and, therefore, helps maintain valve 60 within the body of pig 40. An adjustment screw 64 may be employed to hold valve 60 in a less than fully opened positioned in order to provide a predetermined maximum bypass flow.

Stopper 62 has sufficient mass and/or aerodynamic drag to overcome the spring force of gas spring 80 which holds valve 60 in the open position. Gas spring 80 is contained within a hollow valve stem housing 70. Housing 70 is oriented coaxial to the central longitudinal axis of pig 40 and is received and supported by spoke-shaped bracket 72 at forward end 44. A valve sleeve 74, which is connected to stopper 62, slides over housing 70.

Gas spring 80 is used to hold modulating valve 60 in the open position by providing neutralizing resistance to the pipeline flow, thus keeping valve 60 open under normal pipeline conditions. Gas spring 80 may be replaced by a traditional coil compression or tension spring but gas spring 80 is preferred over these mechanical springs because of its wide range of output forces, low spring rate, and ease of adjustment.

Gas springs suitable for use as gas spring 80 are available in a wide range of preload capacities to match pipeline conditions. Output force may be adjustable by way of a spring bleed off valve that provides fine-tuning field adjustment to match pipeline conditions. The internal damping feature of the gas spring 80 ensures smooth motion of valve 60, avoiding instability. The output force of gas spring 80 may be adjusted in the field prior to launch by replacing spring adjustment screw 82 with one that is longer or shorter. For example, screw 82 shown in FIG. 3 further compresses gas spring 80 thus increasing the output force whereas screw 82 shown in FIG. 1 does not provide any additional spring compression.

The maximum bypass through the venturi 56 may be manually adjusted prior to launching pig 40 by replacing a rearward adjustment screw 64 with a longer substitute to prevent valve 60 from reaching a fully opened position. For example, adjustment screw 64 in FIG. 1 allows valve 60 to open to the fully extended position whereas the longer screw 64 in FIG. 3 limits the rearward travel of valve 60, thereby restricting the maximum allowable bypass flow. The maximum bypass is adjusted based upon such factors as pipeline flow rate and pig drag.

Valve 60 uses a combination of mass/inertia and increased flow rate during stalling to ensure that stopper 62 chokes down instantly upon sudden stalling of pig 40, thus starting pig 40 instantly moving again before significant pressure builds up behind pig 40 (and therefore control surging). The ability of stopper 62 to instantly open again, due to inertia, when pig 40 surges forward minimizes the tendency of pig 40 to surge to speeds even higher than the average fluid flow velocity in the pipeline.

In a preferred embodiment, gas spring 80 holds stopper 62 in a withdrawn or open position relative to the inlet side 58 of venturi 56, thereby allowing a predetermined maximum bypass flow through venturi 56. Immediately upon pig 40 stalling, stopper 62 does not close completely but reduces the bypass flow area through venturi 56 to a predetermined minimum bypass flow to ensure that the pig will start and run. The predetermined minimum bypass flow is effective for causing an acceleration of pig 40 to a speed below that of an average speed of a pipeline product flow. If the friction of pig 40 increases somewhat due to changes in the internal diameter of the pipeline or the accumulation of debris, stopper 62 will tend to close slightly as flow rate through venturi 56 increases, thereby creating more driving pressure drop across pig 40 and keeping pig 40 moving at a desirable rate of travel. The predetermined maximum bypass flow is effective for causing a speed reduction of pig 40 below that of an average speed of a pipeline product flow. In a preferred embodiment, the speed reduction is in a range of 30% to 90% of the average speed of the pipeline product flow.

In a cleaning pig application, this minimum bypass area will still allow flow through pig 40 which will tend to clear away any forward debris and allow pig 40 to start running again. In a dispersal pig application, the venturi-shaped bypass 48 will create smooth, high velocity flow which maximizes the suction vacuum and energy of the gas/liquid mixture being sprayed out the front of a nozzle while functioning as previously described to minimize velocity, stalling, and surging of pig 40.

Figure 4:
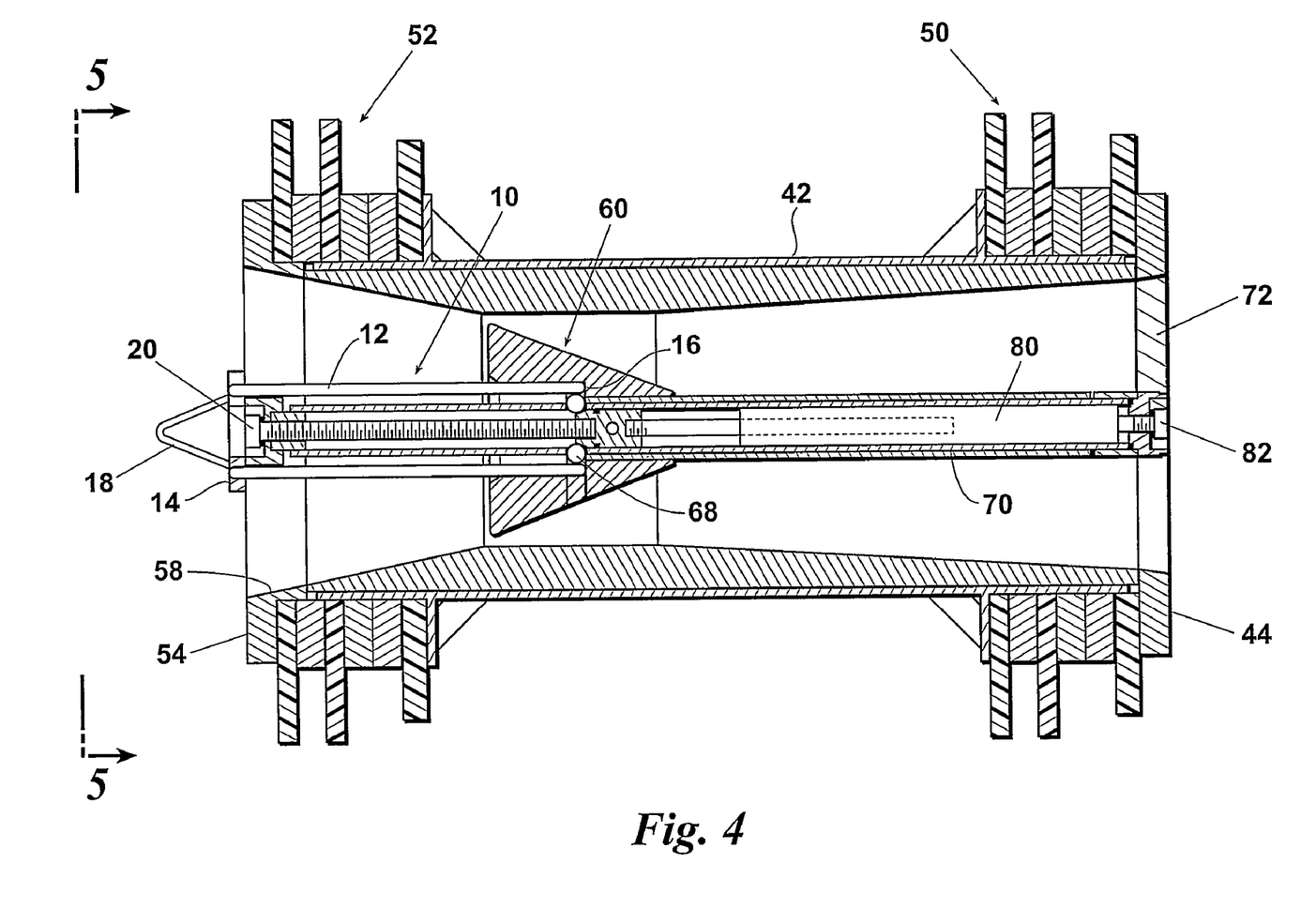
FIG. 4 is a cross-sectional view of the pipeline pig after a bolt has been installed to compress the modulating valve between the open position and a closed (fully compressed) position. In the closed position, the modulating valve provides for minimum bypass flow through the pig. A launch pin provides a locking means for holding the modulating valve in the closed position.
Figure 5:
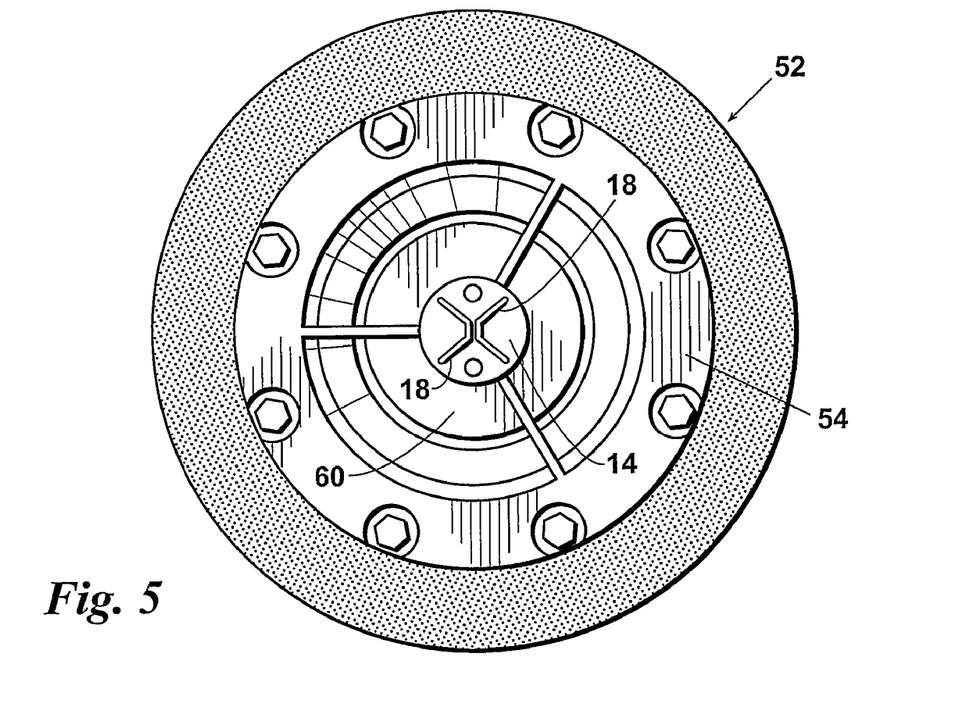
FIG. 5 is a view of the pipeline pig taken along section line 5-5 of FIG. 4.
Figure 6:
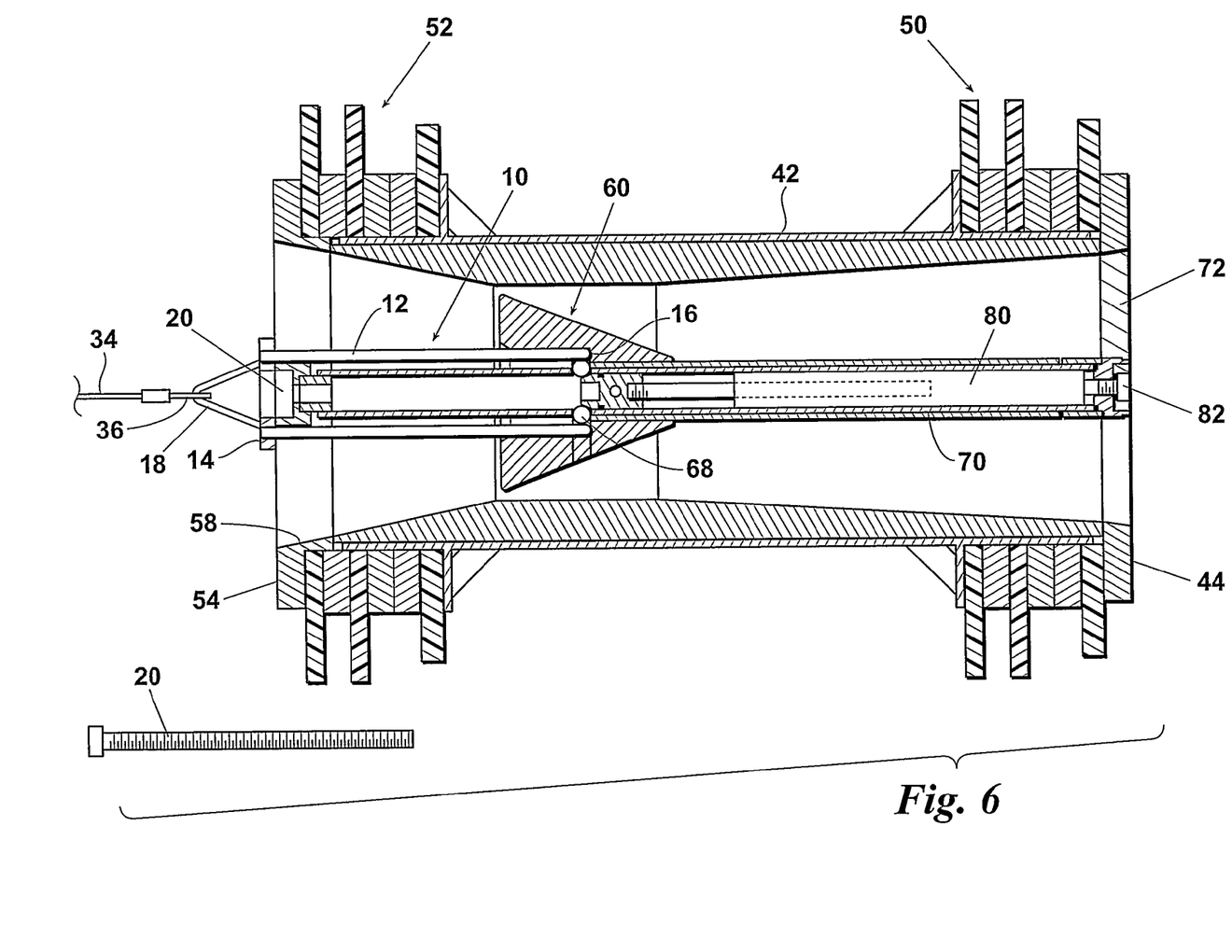
FIG. 6 is a cross-sectional view of the pipeline pig after the bolt has been removed. The launch pin actuates a ball detent arrangement that locks the modulating valve into its closed position. The rearward adjustment screw may then be re-inserted if desired. Retractor clips at the end of a retractable lead are attached to a clip receiver of the launch pin.
Figure 7:
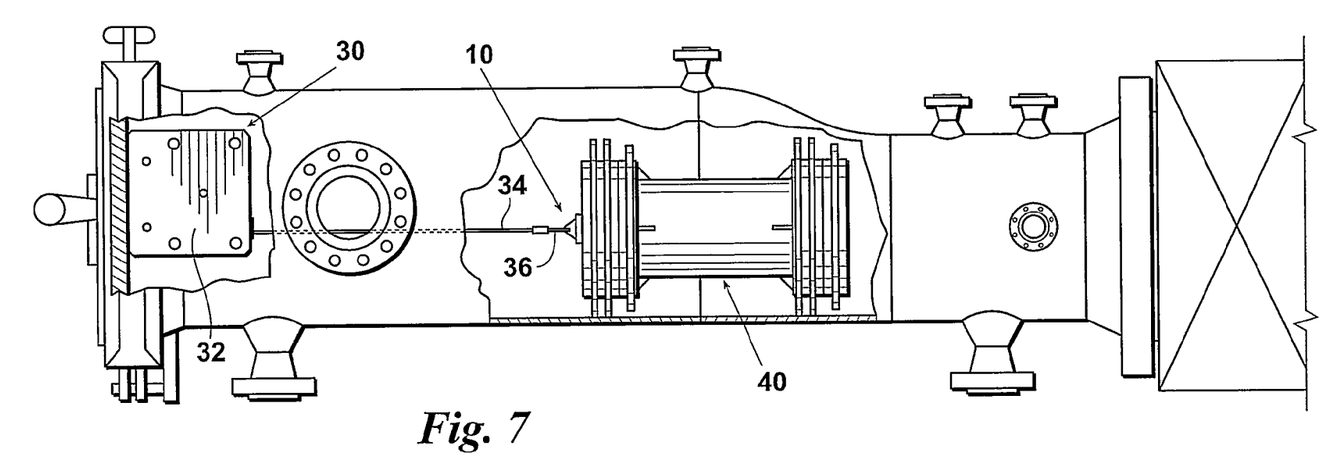
FIG. 7 is a view of the pipeline pig within the pig launcher. The retractor device is held to the closure door by a strong magnet and includes a retractor means such as a lead. The retractable lead extends from the retractor device and holds the pig in a starting position.

Referring now to FIGS. 4 to 6, modulating bypass valve 60 includes a ball 68 (or balls 68) located within a cylindrical recess 66 of stopper 62. A ball detent 76 for receiving ball 68 is located about an external surface of housing 70. In preparation for launch, adjustment screw 64 is removed and modulating valve 60 is compressed with a bolt 20 so that valve 60 is positioned and held in a closed (fully compressed) position. In a preferred embodiment, the closed bypass valve 60 restricts bypass flow to 3%. A locking means, preferably in the form of a launch pin 10, is inserted into cylindrical recess 66. Launch pin 10 includes a body or pin portion 12, a top end or head 14, and a bottom end 16. In a preferred embodiment, body 12 accommodates the spokes of end plate 54 and is in coaxial alignment to the central hub or opening 55 in end plate 54 (see FIG. 2). Head 14 is oversized relative to central hub 55 and helps retain pin 10 relative to end plate 54. Bottom end 16 engages each ball 68 and pushes each ball 68 into its respective detent 76, thereby locking valve 60 in the closed position. Bolt 22 may then be removed and adjustment screw 64 may be replaced.

Launch pin 10 is a retractable launch pin. A retractor clip 36 is attached to a clip receiver 18 located on the head 14 of pin 10. Retractor clip 36 is connected to the distal end of a lead 34.

Referring to FIGS. 7 to 10, lead 34 is a retractable lead having a length L and housed within and released from a retractor device 30. Length L is preferably a length that accounts for the total distance that pig 40 must travel from the pig launcher in order to pass the first mainline valve and bypass tee of the pipeline. Retractor device 30 includes a housing 32 that is detachably secured to the inside closure door of the launcher. In a preferred embodiment, housing 32 includes a set of magnets for this purpose.

Figure 8:
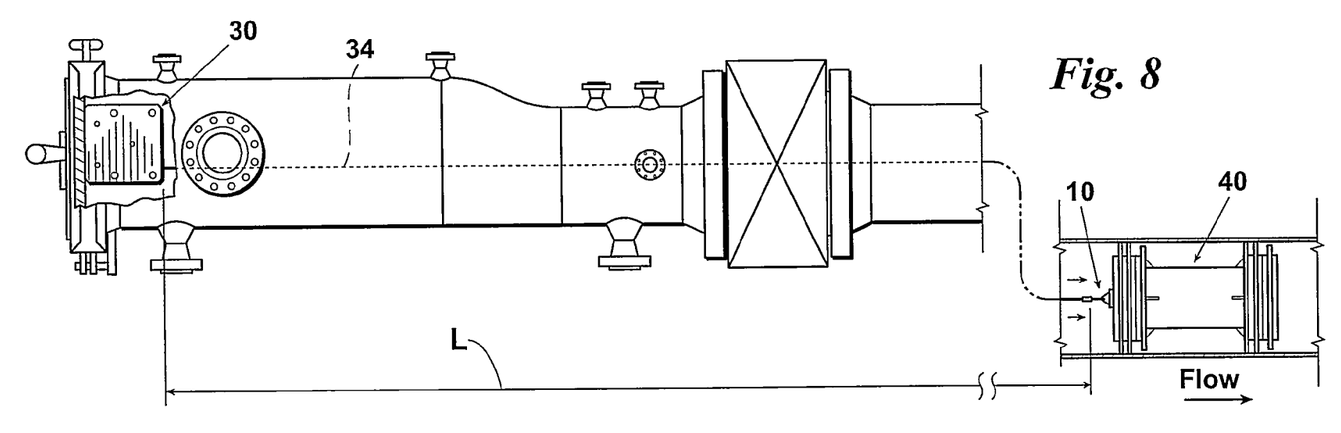
FIG. 8 is a view of the pipeline pig after the pig has launched and entered the pipeline. Once the pig passes the first mainline valve and bypass tee downstream of the pig launcher, the retractable lead reaches the end of its length.
Figure 9:
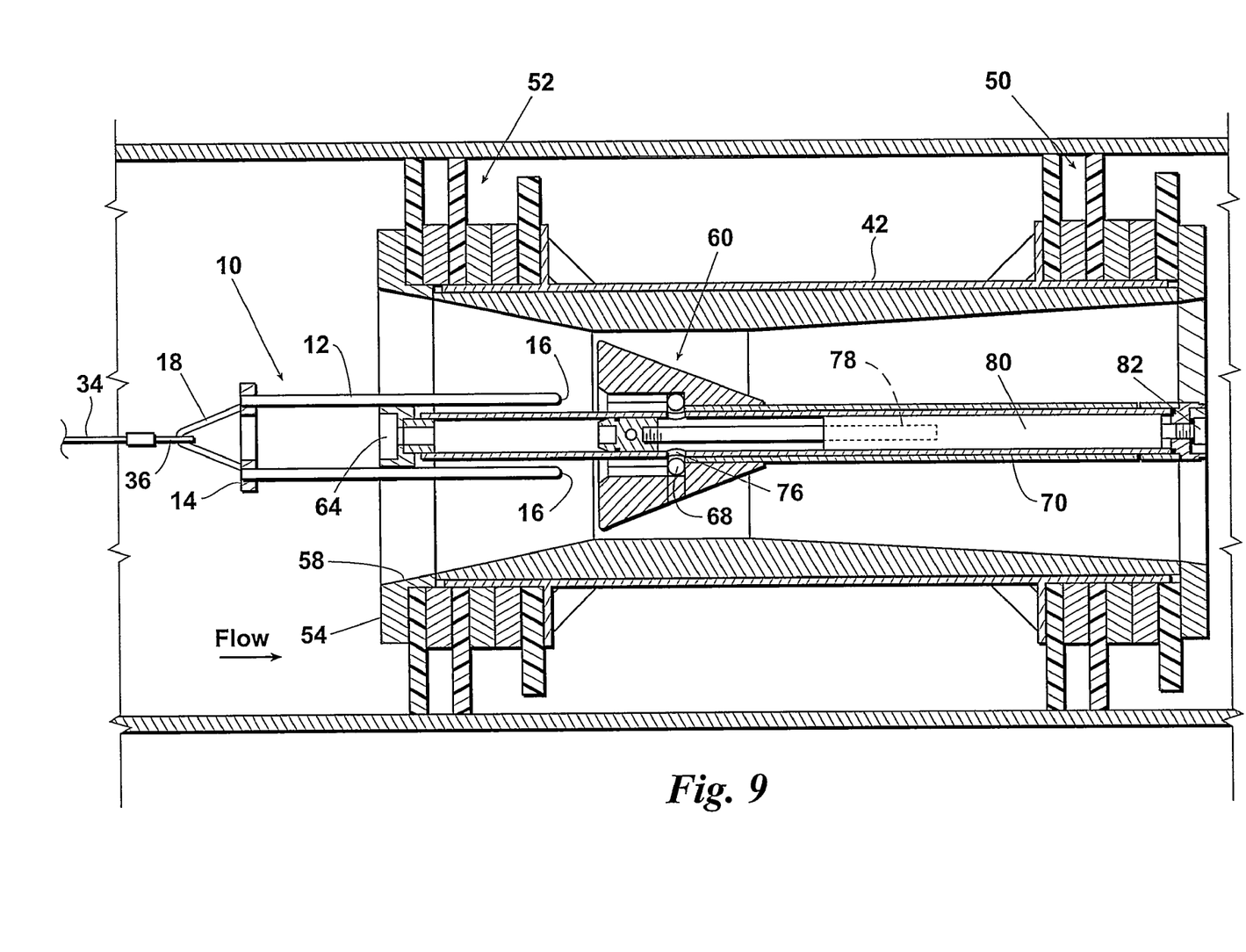
FIG. 9 is a view of the pipeline pig as the retractable lead reaches the end of its length and pulls the launch pin free while the pig continues travelling through the pipeline. As the launch pin is pulled free, the ball detents are released and the modulating valve is free to move between the closed position and the open position.
Figure 10:
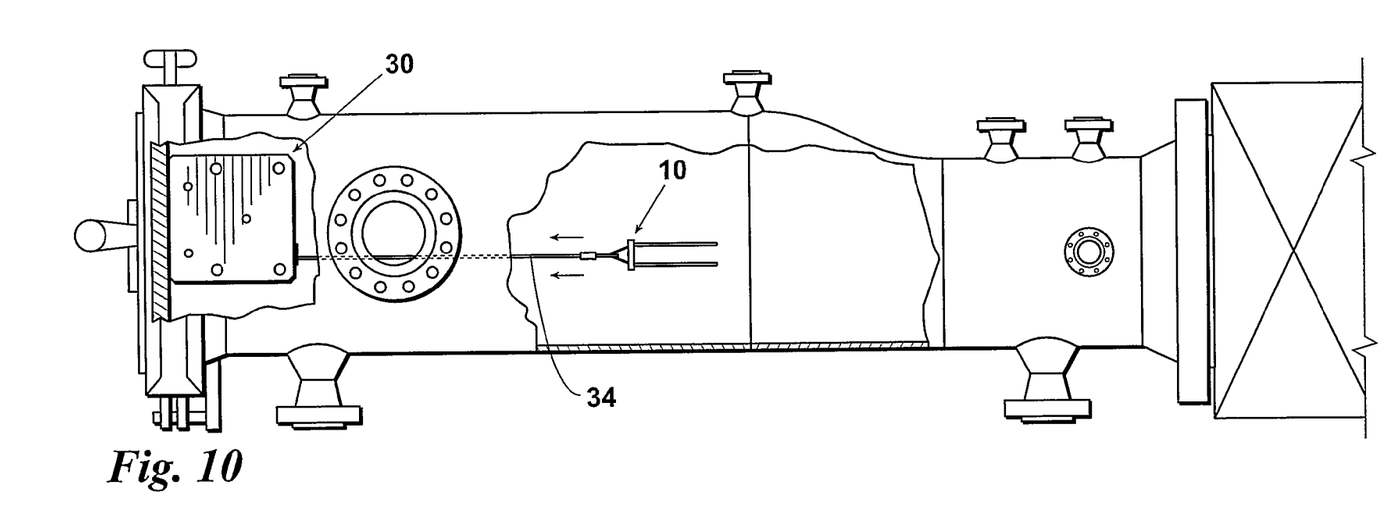
FIG. 10 is a view of the launch pin as it is travels back to the pig launcher. The retraction device automatically reels the launch pin back to the closure door for easily removal.
Figure 11:
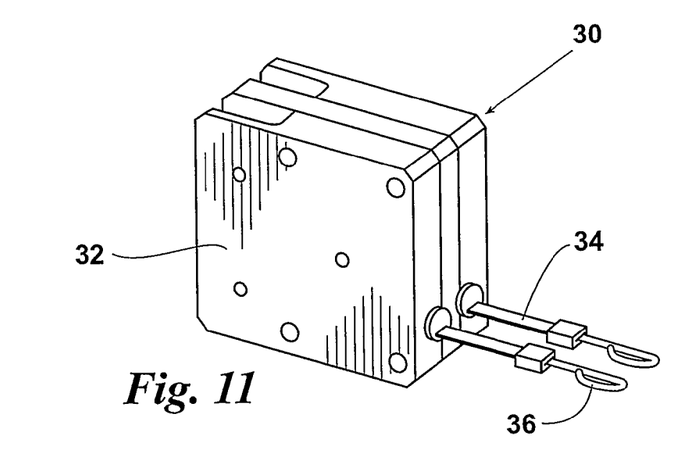
FIG. 11 is a view of the retraction device. Two retractable leads with clips are housed by the retraction device.

After pig 40 leaves the launcher and passes the mainline valve and bypass tee, retractable lead 34 reaches the end of its length L and pulls launch pin 10 away from the rearward end 46 of pig 40 as pig 40 continues travelling through the pipeline. Retraction device 30 automatically reels launch pin 10 back to the closure door for removal. Because modulating valve 60 is no longer retained in a compressed state by launch pin 10, the valve 60 opens and continues normal operation.

While a launching pin and retraction device and method for its use has been described with a certain degree of particularity, many changes may be made in the details of construction and the arrangement of components without departing from the spirit and scope of this disclosure. A launching pin and retraction device according to this disclosure, therefore, is limited only by the scope of the attached claims, including the full range of equivalency to which each element thereof is entitled.

What is claimed is:

1. A method for launching a pipeline pig, the method comprising the steps of:
   compressing a bypass valve of a pipeline pig so that the bypass valve is in a compressed position that provides for a predetermined bypass flow;
   installing a locking means to temporarily maintain the bypass valve in the compressed position;
   inserting the pipeline pig into a launcher connected to the pipeline;
   launching the pipeline pig for travel through the interior of the pipeline;
   removing the locking means after the pipeline pig has travelled a predetermined distance through the interior of the pipeline; and
   retrieving the locking means through the launcher.

2. A method according to claim 1 further comprising the locking means being a launching pin.

3. A method according to claim 1 further comprising the step of retrieving including the step of attaching a retrieval means to the locking means.

4. A method according to claim 3 further comprising the retrieval means being a retractable lead.

5. A method according to claim 1 further comprising the predetermined distance being a distance greater than a distance between the starting position of a rearward end of the pipeline pig and a first mainline valve and bypass tee of the pipeline.

6. A method according to claim 1 further comprising said step of compressing including the step of moving the bypass valve between a first position and a second position, the first position allowing a maximum bypass flow through a venturi of the pipeline pig, the second position allowing a minimum bypass flow through the venturi of the pipeline pig.

* * * * *